May 28, 1968   B. K. TAFFT   3,385,404
MULTIPLE ACTUATOR INTERNAL SHOE DRUM BRAKE
Filed May 13, 1966   3 Sheets-Sheet 1
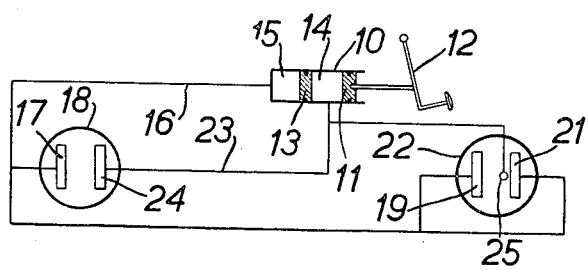
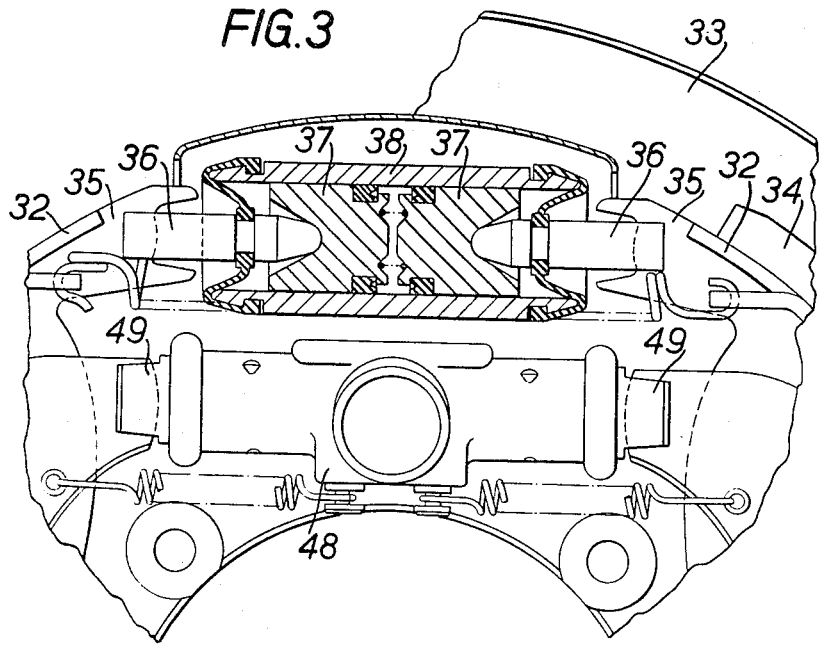

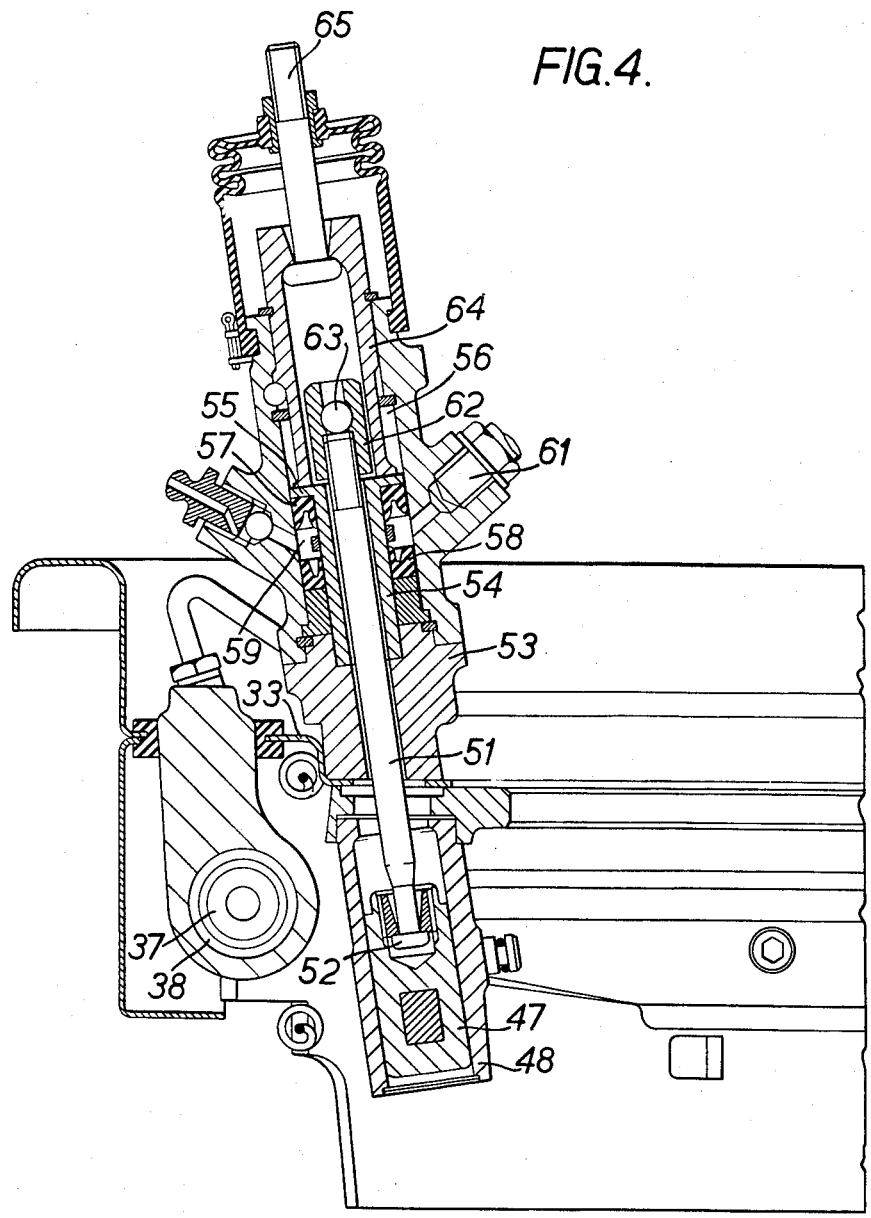

United States Patent Office 3,385,404
Patented May 28, 1968

3,385,404
MULTIPLE ACTUATOR INTERNAL SHOE DRUM BRAKE
Brian K. Tafft, Kenilworth, England, assignor to Girling Limited, Tyseley Birmingham, England
Filed May 13, 1966, Ser. No. 549,973
2 Claims. (Cl. 188—106)

ABSTRACT OF THE DISCLOSURE

In a shoe drum brake opposed arcuate shoes are applied to a rotatable drum by double-ended hydraulic slave cylinders located between the shoe ends, both shoes acting as leading shoes in both directions of rotation of the drum, and one or both shoes is adapted to be applied to the drum by a third hydraulic slave cylinder.

---

Figure 2:
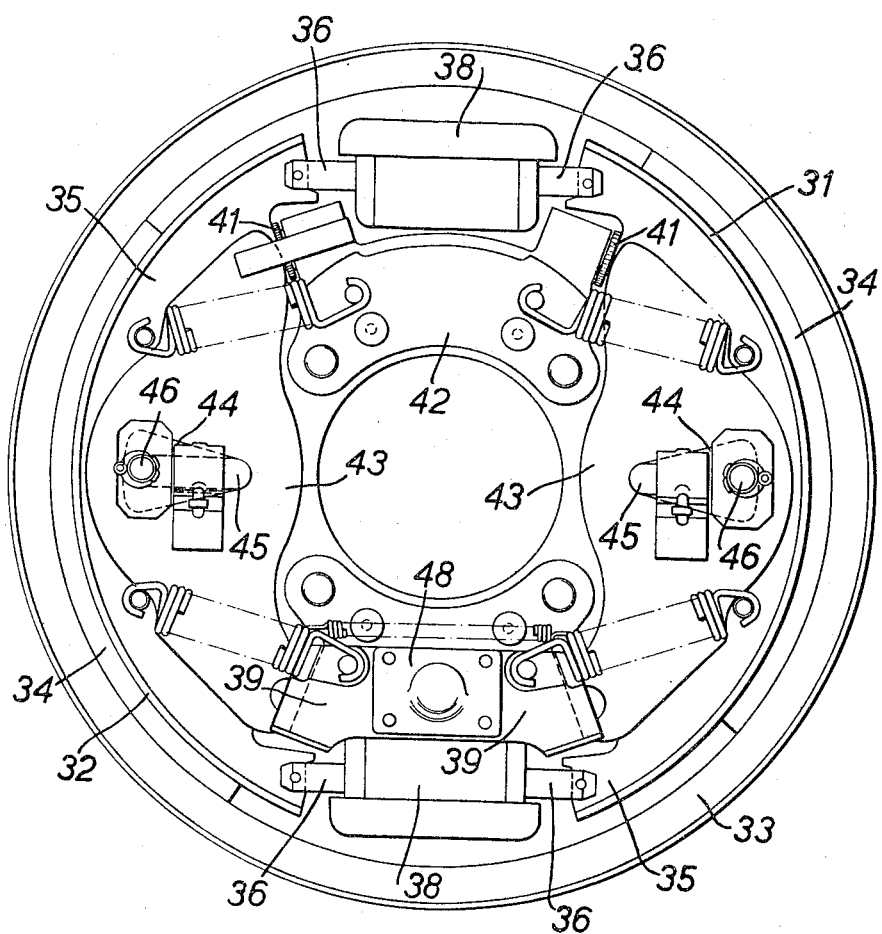

This invention relates to improvements in internal shoe drum brakes of the kind in which opposed arcuate shoes are applied to a rotatable drum by double-ended hydraulic slave cylinders located between the shoe ends, both shoes acting as leading shoes in both directions of rotation of the drum.

A brake of this kind is described in the specification of our Patent No. 3,191,722.

It is desirable, and in some countries it is a legal requirement, that provision is made for applying the brakes of a vehicle by two independent means so that failure of one means does not put the brakes out of action.

In brakes of the kind set forth this requirement can be met by supplying fluid to one slave cylinder from one pressure space of a tandem master cylinder and to the other slave cylinder from the other pressure space. However, if one of the hydraulic lines fails this requires the supply to the operative slave cylinder of a volume of fluid substantially equal to that normally supplied to both slave cylinders, and that volume has to be supplied from a single pressure space of the master cylinder.

According to our invention, in a brake of the kind set forth a third hydraulic slave cylinder is incorporated and is adapted to apply one or both shoes to the drum.

In a preferred arrangement the normal double-ended slave cylinders located between the shoe ends are both supplied with fluid from one pressure space of a tandem master cylinder, and the third slave cylinder is supplied with fluid from the other pressure space. Thus if either hydraulic line fails the brakes are still operative.

The third slave cylinder may be associated or combined with mechanical shoe-actuating means of any convenient form. For example, the third cylinder may be mounted on the outside of the back-plate to actuate through a rod at right angles to the back-plate a wedge or equivalent means for applying one shoe or both shoes to the drum either directly or through a carrier, or carriers, the rod also being actuated mechanically from a hand-brake lever for parking or emergency braking.

One advantage of our improved braking system is that as the shoes are applied to the drum for service braking by three hydraulic slave cylinders the dimensions of these cylinders can be reduced so that the combined fluid requirement of the three cylinders is substantially the same as that of the two cylinders normally employed.

One example of a braking system and a brake in accordance with our invention are illustrated in the accompanying drawings in which:

FIGURE 1 is a diagram of the layout;
FIGURE 2 is an end view of one of the rear wheel brakes;
FIGURE 3 is an enlarged end view partly in section of one of the hydraulic actuators and the combined hydraulic and mechanical actuator; and
FIGURE 4 is a longitudinal section of the combined hydraulic and mechanical actuator.

In the layout shown diagrammatically in FIGURE 1 a tandem master cylinder 10 has a main piston 11 directly actuated by a pedal 12 and a floating piston 13. Operation of the pedal applies pressure to hydraulic fluid in a pressure space 14 between the pistons and a pressure space 15 between the piston 13 and the end of the cylinder remote from the pedal.

Hydraulic fluid is supplied from the pressure space 15 through a pipe line 16 to one double-ended wheel cylinder 17 in a brake 18 on a front wheel of a vehicle and to both wheel cylinders 19, 21 in a brake 22 on a rear wheel. The pressure space 14 supplies fluid through a pipe line 23 to the other wheel cylinder 24 in the front wheel brake and to a third cylinder 25 actuating independent means for applying the shoes in the rear wheel brake.

Thus in the event of failure of the pipe line 16 or of the supply of pressure fluid to it the brake on the front wheel can still be applied by the wheel cylinder 24 and the brake on the rear wheel can be applied by the third cylinder 25.

In the event of failure of the pipe line 23 or of the supply of pressure fluid to it the front brake can still be applied by the cylinder 17 and the rear brake by both cylinders 19 and 21.

The brake on the rear wheel is preferably of the kind shown in FIGURES 2 and 3.

Opposed arcuate brake shoes 31, 32 mounted on a stationary back-plate or torque plate 33 carry friction linings 34 adapted to engage with a rotatable drum (not shown). Each shoe is of T-section with a radial web 35. At the ends of the shoes the webs are received in notches in the outer ends of opposed tappets 36 of which the inner ends are in rocking engagement with recesses in opposed pistons 37 in double-ended wheel cylinders 38 of which one is shown in section in FIGURE 3.

The wheel cylinders are bolted or otherwise secured to the back-plate and when fluid under pressure is forced into a cylinder from a pressure space of the master cylinder the tappets 36 are urged apart to move the shoes outwardly into engagement with the drum.

The shoes are free to move circumferentially with the drum through a limited distance and to fulcrum on stationary anchorages at either end according to the direction of rotation of the drum so that both shoes act as leading shoes in both directions of rotation. The shoes fulcrum at one end on fixed abutment members 39 and at the other end on tappets 41 adjustably screwed into a fixed member 42.

The shoes are also adapted to be separated mechanically by a combined mechanical and hydraulic actuator through arcuate carriers or levers 43 located at one side of the shoe webs. Each carrier fulcrums at one end on one of the adjustable tappets 41 and at about the middle of its length has a sector-shaped radial opening 44 housing a radially disposed strut 45 of which the inner end is rounded and in rocking engagement with the rounded inner end of the opening. The outer end of the strut is notched to engage a pin 46 fixed in the shoe web. The other ends of the carriers are adapted to be separated by a mechanical separator of known type comprising a wedge 47 (FIGURE 4) located in a housing 48 movable radially between opposed tappets 49 engaging the carriers, free-running rollers being located between the inclined side faces of the wedge and the complementarily inclined inner ends of the tappets.

A rod 51 anchored at 52 in the outer end of the wedge is carried out through the back-plate into a fitting 53 mounted on the outer side of the back-plate. The rod extends through a sleeve 54 formed by an inward extension of a piston 55 working in a bore 56 in the fitting 53 and provided with a seal 57. The sleeve is sealed by a stationary seal 58, the space 59 between the two seals forming an hydraulic cylinder to which hydraulic fluid is supplied from the master cylinder through a union 61. A bush 62 screwed onto the outer end of the rod is secured by a cross-pin 63 to a sleeve 64 which is axially slidable in the outer end of the fitting 53. The bush 62 forms an abutment for the piston 55 for hydraulic operation of the rod 53 and wedge, and a pull-rod 65 coupled to the outer end of the rod 51 adapted to be connected to a hand-lever or the like for manual operation of the rod and wedge.

The hydraulic cylinder 59 formed by the space between the seals 57 and 58 corresponds to the third cylinder 25 in FIGURE 1 while the wheel cylinders 38 correspond to the cylinders 19 and 21. The cylinders 38 are supplied with pressure fluid from one of the pressure spaces in the tandem master cylinder which also supplies one of the wheel cylinders in a front wheel brake, and the cylinder 59 is supplied with fluid from the other pressure space which also supplies the second wheel cylinder in the front wheel brake.

In an alternative arrangement the brake incorporating the third hydraulic cylinder may be on a front wheel while the brake on the rear wheel is of the normal type with two double-ended wheel cylinders only.

I claim:
1. An hydraulic braking system for vehicles incorporating an internal shoe drum brake on each of at least two wheels, each shoe drum brake comprising a pair of arcuate shoes mounted on a stationary back-plate and carrying friction linings for engagement with said drum, said shoes having first and second adjacent, separable shoe ends, two only double ended hydraulic slave cylinders in the brakes of one of said wheels disposed respectively between the first and second adjacent shoe ends thereof, three only hydraulic slave cylinders in the brakes of a second of said wheels, at least the first and second of said three cylinders being double ended and disposed respectively between the first and second adjacent shoe ends of said brake, the double ended slave cylinders and the shoes of the brakes of the first and second wheels being constructed and arranged that in the application of the shoes to the respective drums both shoes act as leading shoes in both directions of rotation of the drums, means responsive to the delivery of hydraulic pressure to said third hydraulic cylinder for separating the shoes of said second brake and apply the same to the drum thereof, a tandem master cylinder having two pressure spaces one of which is connected only to one double acting slave cylinder of said first brake and to the third hydraulic cylinder of said second brake and the other of which is connected only to the other double acting slave cylinder of said first brake and to the first and second double acting slave cylinders of said second brake.

2. An hydraulic braking system for vehicles as claimed in claim 1, wherein said third hydraulic cylinder in said second shoe drum brake is part of a combined hydraulic and mechanical actuator for applying the shoes of that brake to said drum.

References Cited

UNITED STATES PATENTS

| | | | |
|---|---|---|---|
| 2,148,240 | 2/1939 | La Brie | 188—152 |
| 2,230,411 | 2/1941 | Parnell et al. | 188—106 X |
| 2,918,148 | 12/1959 | Uhlenhaut et al. | 188—152 |
| 3,191,722 | 6/1965 | Redmayne | 188—78 |

DUANE A. REGER, *Primary Examiner.*